(12) United States Patent
Norieda (10) Patent No.: US 9,552,931 B2
(45) Date of Patent: Jan. 24, 2017

(54) POLARIZABLE ELECTRODE MATERIAL AND ELECTRIC DOUBLE LAYER CAPACITOR USING SAME

(71) Applicant: W. L. Gore & Associates, Co., Ltd., Tokyo (JP)

(72) Inventor: Hiroyuki Norieda, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 62 days.

(21) Appl. No.: 14/413,321

(22) PCT Filed: Jul. 25, 2013

(86) PCT No.: PCT/JP2013/070214
§ 371 (c)(1),
(2) Date: Jan. 7, 2015

(87) PCT Pub. No.: WO2014/017597
PCT Pub. Date: Jan. 30, 2014

(65) Prior Publication Data
US 2015/0138693 A1    May 21, 2015

(30) Foreign Application Priority Data

Jul. 26, 2012  (JP) .................................. 2012-165800

(51) Int. Cl.
*H01G 11/46*    (2013.01)
*H01G 11/32*    (2013.01)
(Continued)

(52) U.S. Cl.
CPC .............. *H01G 11/46* (2013.01); *H01G 11/24* (2013.01); *H01G 11/32* (2013.01); *H01G 11/38* (2013.01);
(Continued)

(58) Field of Classification Search
CPC ......... H01G 11/46; H01G 11/38; H01G 11/24; H01G 11/52; H01G 11/32; H01G 2009/0007
See application file for complete search history.

(56) References Cited

U.S. PATENT DOCUMENTS

| 6,094,338 A * | 7/2000 | Hirahara | H01G 9/155 29/25.03 |
| 2012/0202033 A1* | 8/2012 | Chang | H01G 11/24 428/219 |
| 2013/0100583 A1* | 4/2013 | Ito | H01G 9/058 361/502 |

FOREIGN PATENT DOCUMENTS

| JP | 10-106900 | 4/1998 |
| JP | 2003-209029 | 7/2003 |

(Continued)

OTHER PUBLICATIONS

Yoon et al., Development of high-performance supercapacitor electrodes using novel ordered mesoporous tungsten oxide materials with high electrical conductivity, Nov. 10, 2010, Chem. Commun., 47, 1021-1023.*

(Continued)

*Primary Examiner* — David M Sinclair
(74) *Attorney, Agent, or Firm* — Kilpatrick Townsend & Stockton, LLP (57) ABSTRACT

Disclosed is a polarizable electrode material for an electric double layer capacitor with a high energy density and excellent long-term reliability, as well as an electric double layer capacitor in which the polarizable electrode material is used. The polarizable electrode material includes porous carbon particles, a conductive assistant, a tungsten oxide powder and a binder, wherein the tungsten oxide is dispersed in the polarizable electrode material so that the tungsten oxide per 1 g of the polarizable electrode material has a surface area of 0.2 $m^2$ or more and less than 6 $m^2$.

8 Claims, 2 Drawing Sheets

(51) Int. Cl.
*H01G 11/52* (2013.01)
*H01G 11/24* (2013.01)
*H01G 11/38* (2013.01)
*H01G 9/00* (2006.01)

(52) U.S. Cl.
CPC ...... *H01G 11/52* (2013.01); *H01G 2009/0007* (2013.01); *Y02E 60/13* (2013.01); *Y02T 10/7022* (2013.01)

(56) References Cited

FOREIGN PATENT DOCUMENTS

| | | | |
|---|---|---|---|
| JP | 2003-282371 | 10/2003 | |
| JP | 2007-067155 | 3/2007 | |
| JP | 2007-073810 | 3/2007 | |
| JP | 2008-112827 | 5/2008 | |
| JP | 2008-252062 | 10/2008 | |
| JP | 2008252062 A * | 10/2008 | |
| JP | 2008-270807 | 11/2008 | |
| JP | 2011-233845 | 11/2011 | |
| JP | WO 2011136390 A1 * | 11/2011 | ............. H01G 9/058 |
| WO | WO2008/056536 | 5/2008 | |

OTHER PUBLICATIONS

Frontiers of Development of Next-Generation Capacitor, Supervisors: Katsuhiko Naoi, Atsushi Nishino, Gijyutukyouiku, 2009, p. 91 and p. 141. (English Translation).

* cited by examiner

POLARIZABLE ELECTRODE MATERIAL AND ELECTRIC DOUBLE LAYER CAPACITOR USING SAME

TECHNICAL FIELD

The present invention relates to a polarizable electrode material for an electric double layer capacitor with improved voltage endurance, for the purpose of improving an energy density and long-term reliability, and to an electric double layer capacitor in which the polarizable electrode material is used. Specifically, the present invention relates to a polarizable electrode material for a high-withstand-voltage-type electric double layer capacitor in which energy density is high and time degradation such as a decrease in capacitance over time or increase in resistance over time is precluded, i.e., long-term reliability is excellent; and to an electric double layer capacitor in which the polarizable electrode material is used.

BACKGROUND ART

An electric double layer capacitor is an electrical storage element in which the capacitance of electric double layers formed by adsorbing/desorbing electrolyte ions on interfaces between a pair of positive and negative polarizable electrodes and an electrolyte solution is utilized.

Small capacity type capacitors for memory backup etc., intermediate capacity type capacitors and large capacity type capacitors such as auxiliary power supplies for electric vehicles, auxiliary power supplies for solar batteries, auxiliary power supplies for wind power generation, and momentary interruption compensation devices have been widely examined for applications of electric double layer capacitors.

An electric double layer capacitor has characteristics such as a capacitance (C), a working voltage (V), an energy density (E), an internal resistance and a working life. Improvement in all the characteristics is important; however, recently, improvement in energy density which is the disadvantage of electric double layer capacitors and further prolongation of a working life (improvement in long-term reliability) which is their advantage have also been particularly demanded in the applications of the above-mentioned small to large capacity types.

Since the energy density (E) of an electric double layer capacitor is proportional to the square of a working voltage (energy density $E=0.5 \times C \times V \times V$ (wherein C: capacitance, V: working voltage)), increase in working (withstand) voltage is effective for improvement in energy density.

Electric double layer capacitors are those in which electrolyte solutions are based on water and not based on water. When the water-based electrolyte solution is used, there is an advantage that a low-resistance-type electric double layer capacitor is obtained, but it is necessary to control a working voltage to not more than a voltage at which electrolysis of water occurs, and it is used at around 0.8 V. In contrast, the non-water-based electrolyte solution can be used at a higher voltage, and it is used usually at a working voltage of around 2.5 V, and at a higher voltage of around 2.7 V. Recently, a capacitor used at a higher working voltage and having a withstand voltage of 3.0 V or more has been demanded. This is because, when a plurality of capacitors are connected and used in the application of a high voltage, increase in the withstand voltages of the capacitors results in reduction in the total number of cells used, reduction in cost, and savings in module space. However, there has been a risk that increase in working voltage might accelerate the time degradation of an electric double layer capacitor (decrease in capacitance over time and increase in resistance over time) and a problem of deteriorating long-term reliability which is a characteristic of the electric double layer capacitor.

There are various reasons for the time degradation of an electric double layer capacitor, which are considered to be the following mechanisms. In the electric double layer capacitor, residual moisture in an electrolyte solution and moisture mixed during assembling are present. Also, physical adsorption water and chemically bonded adsorption water exist, on the surface of, and in an activated carbon, a conductive assistant, a binder, a separator and the like, which are used in an electrode layer. These kinds of moisture are desorbed as water during repeating discharge and charge and are electrolyzed by applying a voltage to generate gases, to result in decomposition of an electrolyte (solution), and to generate decomposition products. These decomposition products reduce the surface area of the activated carbon to result in reduction in capacitance by coating the surface of the activated carbon and clogging the pores of the activated carbon. Also, these decomposition products result in increase in resistance by clogging the opening of the separator.

Therefore, reduction in moisture, suppression of reduction in the surface area of an activated carbon by a decomposition product, and suppression of decomposition of an electrolyte solution have been considered to be effective for developing a high-withstand-voltage electric double layer capacitor. These development techniques are considered not to be independent of each other but to be related to each other. Further, since there are a plurality of mechanisms of time degradation of an electric double layer capacitor as mentioned above, only the reduction in moisture, the suppression of reduction in the surface area of an activated carbon by a decomposition product, and the suppression of the decomposition of an electrolyte solution are not techniques effective for developing a high-withstand-voltage electric double layer capacitor.

The avoidance of the decomposition of an electrolyte solution has been examined but has been considered to be difficult, because activated carbon used in an electric double layer capacitor has a catalytic action because of having a large surface area for increasing an adsorption capacity. It is said that the catalytic action is caused by a functional group on the surface of the activated carbon (see Non Patent Literature 1).

As a method for reducing moisture in an electric double layer capacitor, the higher withstand voltage and longer life of the electric double layer capacitor is reported to be achieved by, for example, improving the material of a separator to develop the separator that is not deteriorated even on a high temperature and long-term drying condition (for example, see Patent Literatures 1 and 2). The drying temperature condition can be enhanced by improving the separator. However, there have been problems that an organic matter component used in another configuration site in the electric double layer capacitor, such as a binder or an adhesive layer, is deteriorated to coat an activated carbon or the separator or clog pores to result in decrease in capacitance and that a resistance is increased with separation of an interface between an electrode and a collector. Further, heat treatment in a vacuum or under an inert gas air stream at several hundred degrees Celsius is necessary for completely removing moisture in the pores of the activated carbon and a functional group on the surface of the activated carbon, and this method has not been practical in light of a cost.

In addition to this, a high-withstand-voltage electric double layer capacitor excellent in long-term reliability is reported to be obtained by subjecting a carbon fiber woven fabric to activation treatment and thereafter to heat treatment at 700 to 1000° C. under inert gas atmosphere to remove moisture adsorbed in the activated carbon fiber woven fabric and a surface functional group (for example, see Patent Literature 3). The moisture adsorbed in the activated carbon fiber woven fabric and the surface functional group can be removed by subjecting the activated carbon fiber woven fabric to the heat treatment at 700 to 1000° C. under the inert gas atmosphere. However, there is a problem that the readsorption of moisture and the reintroduction of a surface functional group occur unless the activated carbon fiber woven fabric after the removal is stored under a completely dehumidified situation to assemble the electric double layer capacitor, and this method is not practical.

In addition to this, there is reported an example in which the decomposition of an electrolyte solution is considered to be caused by an acid due to moisture generated in a positive electrode and various antacids are added into an activated carbon polarizable electrode (for example, see Patent Literature 4). Further, there is reported an example in which the decomposition of an electrolyte solution is considered to occur due to hydrogen ions generated by electrolyzing generated moisture and hydrogen ions are reduced by reacting with or absorbing hydrogen ions, for example, an aluminum powder is added into an electrode (for example, see Patent Literature 5). However, there is a problem that an antacid sometimes decomposes and reacts with an electrolytic solution during the discharge and charge of an electric double layer capacitor. In the case of the addition of the aluminum powder, aluminum may react with electrolyte ions to synthesize, e.g., aluminum fluoride or the like. Aluminum fluoride, which is an insulator, may increase a resistance and is not too preferable.

The generation of a gas due to a surface functional group and reaction with an electrolyte solution are reported to be suppressed by reacting the surface functional group of a carbon material, which is a main component of a polarizable electrode, with an organosilicon compound to cap it with a chemical bond (for example, see Patent Literature 6). The method of capping the surface functional group of the activated carbon by using the organosilicon compound has had a problem that not only the surface functional group is capped but also the pores of the carbon material are clogged depending on production conditions and, as a result, a capacitance is reduced.

The present inventors have proposed that an electrode for a high-withstand-voltage-type electric double layer capacitor with a high energy density and less degradation over time in capacitance and resistance, that is, excellent long-term reliability, and the electric double layer capacitor could be provided by adding tungsten oxide to an electrode material (see Patent Literature 7).

CITATION LIST

Patent Literature

[Patent Literature 1]
Japanese Patent Laid-Open No. 2007-67155
[Patent Literature 2]
Japanese Patent Laid-Open No. 2008-112827
[Patent Literature 3]
Japanese Patent Laid-Open No. 2003-209029
[Patent Literature 4]
Japanese Patent Laid-Open No. 2007-73810
[Patent Literature 5]
Japanese Patent Laid-Open No. 10-106900
[Patent Literature 6]
Japanese Patent Laid-Open No. 2008-252062
[Patent Literature 7]
Japanese Patent Laid-Open No. 2011-233845

Non Patent Literature

[Non Patent Literature 1]
"Frontiers of Development of Next-Generation Capacitor", Supervisors: Katsuhiko Naoi, Atsushi Nishino, Gijyutukyouiku, 2009, p. 91 and p. 141

SUMMARY OF INVENTION

Technical Problem

The present invention is aimed at providing a polarizable electrode material for a high-withstand-voltage-type electric double layer capacitor with a high energy density and less degradation over time in capacitance and resistance, i.e., excellent long-term reliability, in comparison with the related art; and at providing an electric double layer capacitor in which the polarizable electrode material is used.

Solution to Problem

In accordance with the present invention,
(1) there is provided a polarizable electrode material used in an electric double layer capacitor and comprising porous carbon particles, a conductive assistant, a tungsten oxide powder and a binder, wherein
the tungsten oxide is dispersed in the polarizable electrode material so that the tungsten oxide per 1 g of the polarizable electrode material has a surface area of 0.2 $m^2$ or more and less than 6 $m^2$.

Furthermore, in accordance with the present invention,
(2) there is provided the electrode material according to (1), wherein the tungsten oxide has a primary particle diameter of 0.05 μm or more and 0.4 μm or less.

Furthermore, in accordance with the present invention,
(3) there is provided the electrode material according to (1) or (2), wherein a content of the tungsten oxide in the electrode material is less than 40 mass %.

Furthermore, in accordance with the present invention,
(4) there is provided the electrode material according to any one of (1) to (3), wherein a percentage of a mesopore volume to a total pore volume in the porous carbon particles is 30% or more and less than 85%.

Furthermore, in accordance with the present invention,
(5) there is provided the electrode material according to any one of (1) to (4), wherein the electrode material is made to be in sheet form by rolling treatment.

Furthermore, in accordance with the present invention,
(6) there is provided the electrode material according to any one of (1) to (5), wherein the binder is polytetrafluoroethylene.

Furthermore, in accordance with the present invention,
(7) there is provided an electric double layer capacitor, wherein the electrode material according to any one of (1) to (6) is disposed in at least a side of a negative electrode via a separator.

Furthermore, in accordance with the present invention, (8) there is provided an electric double layer capacitor, wherein a pair of the positive and negative electrode materials according to any one of (1) to (6) is disposed via a separator.

Advantageous Effects of Invention

In accordance with the present invention, there are obtained a polarizable electrode material for an electric double layer capacitor with high voltage endurance, aimed at improving an energy density and long-term reliability in comparison with the related art, and an electric double layer capacitor in which the polarizable electrode material is used. Specifically, there are obtained an electrode for a high-withstand-voltage-type electric double layer capacitor with a high energy density and less degradation over time in capacitance and resistance, that is, excellent long-term reliability, and the electric double layer capacitor.

DESCRIPTION OF EMBODIMENTS

The present inventors performed extensive examination in order to solve the above-described problems. As a result, it was found that an electrode for a high-withstand-voltage-type electric double layer capacitor with a high energy density and less degradation over time in capacitance and resistance, that is, excellent long-term reliability, in comparison with the related art, and the electric double layer capacitor can be provided by, e.g., dispersing tungsten oxide in a polarizable electrode material so that the surface area of the tungsten oxide per 1 g of the electrode material is within a specified range when the tungsten oxide is added to the electrode material, making the tungsten oxide have a primary particle diameter within a specified range for this purpose, and making porous carbon particles contained in the electrode material have a mesopore volume ratio within a specified range.

The polarizable electrode material according to the present invention is used in an electric double layer capacitor and comprises porous carbon particles, a conductive assistant, a tungsten oxide powder and a binder.

An electric double layer capacitor with a high energy density and less degradation over time in capacitance and resistance, that is, excellent long-term reliability, is obtained by tungsten oxide contained in the polarizable electrode material according to the present invention. The reason why a high effect is exhibited by incorporating tungsten oxide is not sure but is considered to be because the pores of porous carbon particles and a separator are prevented from being clogged by selectively decomposing moisture.

The present invention is characterized in that the tungsten oxide is dispersed in the polarizable electrode material so that the surface area of the tungsten oxide per 1 g of the electrode material is 0.2 m$^2$ or more and less than 6 m$^2$ when the tungsten oxide is added to the electrode material.

In the present specification, unless otherwise specified, the surface area of the tungsten oxide is based on the BET specific surface area of the tungsten oxide in a powder state prior to being mixed as an electrode material, and the BET specific surface area is measured by a nitrogen adsorption method. In other words, the surface area of the tungsten oxide per 1 g of the electrode material is obtained by multiplying the tungsten oxide content of the electrode material by the BET specific surface area of the tungsten oxide.

A higher capacitance retention and a lower internal resistance increase rate in comparison with the related art can be achieved by making the tungsten oxide have a surface area of 0.2 m$^2$ or more and less than 6 m$^2$ per 1 g of the electrode material. When the surface area of the tungsten oxide is smaller than this range, the action of decomposing moisture is not sufficient. When the surface area of the tungsten oxide is larger than this range, the initial capacitance of a capacitor cell is decreased since the percentage of the porous carbon particles is relatively decreased.

In accordance with an embodiment of the present invention, the tungsten oxide may have a primary particle diameter of 0.05 μm or more and 0.4 μm or less. As a result, a higher capacitance retention and a lower internal resistance increase rate can be achieved in comparison with the related art.

Tungsten oxide particles are generally present as secondary particles in which a plurality of primary particles aggregate, and the nominal particle diameter of commercially available tungsten particles refers to a secondary particle diameter. The action of decomposing moisture by tungsten oxide is proportional to the surface area of the tungsten oxide. In addition, the surface area has a correlation with a primary particle diameter rather than a secondary particle diameter. A surface area that substantially contributes to a reaction cannot be determined from a secondary particle diameter, particle diameter control based on a secondary particle diameter or a nominal particle diameter hardly has a correlation with the action of decomposing moisture, and it may be difficult to suitably perform material design. The present inventors focused attention on a primary particle diameter, found that there is a correlation between a surface area determined from the primary particle diameter and a capacitance retention, and achieved an embodiment of the present invention, in which the correlation is utilized for designing an electrode material to provide the superior electrode material.

When it is assumed that primary particles are spherical, letting that the value of the BET specific surface area of a powder is S (m$^2$/g) and the density of the particles is ρ (g/cm$^3$), a primary particle diameter d (μm) is calculated from the expression: $d=6/(S \times \rho)$ (wherein it is assumed that the density of tungsten oxide is 7.16). However, in reality, primary particles may not be spherical, and a BET specific surface area may not be precisely measured depending on the state of their aggregation. As another method for measuring a primary particle diameter, a method of measuring the diameters of optional 200 or more particles from an image of a magnification of 50000 times or more based on observation with a scanning electron microscope (SEM) or a transmission electron microscope (TEM) to determine the average value thereof is also possible. An electrode material that actually has the sufficient effect of decomposing moisture is provided by making the tungsten oxide, which is an embodiment of the present invention, have a primary particle diameter of 0.05 μm or more, more preferably 0.08 μm or more and 0.4 μm or less, more preferably 0.28 μm or less. That is, a higher capacitance retention and a lower internal resistance increase rate can be achieved in comparison with the related art.

In accordance with an embodiment of the present invention, the content of the tungsten oxide in the electrode material may also be less than 40 mass %.

The content of the tungsten oxide powder in the polarizable electrode material is appropriately adjusted so that the surface area of the tungsten oxide per 1 g of the electrode material is in a specified range. Generally, it is preferably a percentage of 2 mass % or more and less than 40 mass %, further preferably a percentage of 4 mass % or more and 30 mass % or less, based on the total mass of the polarizable electrode material (the total mass is a dry mass after removing a molding auxiliary used when the major components of the polarizable electrode material are blended). When the content is less than 2 mass %, the action of decomposing moisture is insufficient and an effect is not sufficient. On the other hand, when the content of the tungsten oxide is more than 40 mass %, the initial resistance of the capacitor cell is increased since the percentage of the porous carbon particles and the conductive assistant is relatively decreased. An addition amount of 4 mass % or more and 30 mass % or less is more preferred since the effect of decomposing moisture is significant and the initial resistance can be sufficiently lowered.

Any secondary particle diameter of the tungsten oxide powder can be used if being in a range without affecting the thickness of an electrode layer when the electrode layer for an electric double layer capacitor is formed. The tungsten oxide powder having a particle diameter of around 0.1 μm to 50 μm is actually preferred because of not affecting the thickness of the electrode layer and not involving too much expenses in grinding/classification steps.

Generally, a tungsten oxide powder having a particle diameter (nominal particle diameter, i.e., secondary particle diameter) of several tens of micrometers is commercially available. As for a powder having a secondary particle diameter which is further smaller than that of this commercially available product, grinding and classification steps are necessary, grinding time is prolonged and a yield is also decreased with decreasing the secondary particle diameter, and a cost therefore becomes high. Accordingly, the minimum secondary particle diameter which can be industrially used is considered to be around 0.1 μm. An electrode layer for an electrical double capacitor usually has a thickness of around 0.01 to 1 mm. Accordingly, it is necessary to control the secondary particle diameter of a tungsten oxide powder to be added to not more than the thickness of the electrode layer, and the practical maximum secondary particle diameter is considered to be up to around 30 μm in consideration of the secondary particle diameter of commercially available tungsten oxide. The tungsten oxide powder can be ground by various methods such as a ball mill, a jet mill and a hammer mill, similarly to the case of the grinding of the activated carbon. If regulation to a target particle size (secondary particle diameter) cannot be carried out by grinding, a particle size (secondary particle diameter) may also be adjusted by classification. A primary particle diameter can also be varied by grinding/classification steps. Generally, due to grinding/classification steps, the shapes of primary particles are made to be more spherical, the state of aggregation tends to disappear, and, therefore, a correlation between a BET specific surface area and a primary particle diameter becomes higher to improve the accuracy of the control of the primary particle diameter.

As a method for mixing tungsten oxide with another electrode material component, e.g., porous carbon particles, a mixing method for homogeneous dispersion is not limited, for example, solid-solid mixing in which tungsten oxide and porous carbon particles are mixed in solid states or a slurry-like dispersion in which at least any one of them is predispersed in liquid such as water or an organic solvent can be used. Furthermore, ultrasonic wave mixing or mixing using a water stream can also be performed in order to improve dispersibility during mixing. Generally, longer mixing time is preferred because of increasing a degree of homogeneous dispersion. Specifically, mixing time may also be 1 minute or more, preferably 5 minutes or more, further preferably 15 minutes or more. However, the upper limit of the mixing time may also be 3 hours or less as a guide since the degree of homogeneous dispersion is not improved when the mixing time is longer than a certain period of time.

The polarizable electrode material according to the present invention contains porous carbon particles. In accordance with an embodiment of the present invention, a percentage of a mesopore volume to the total pore volume in the porous carbon particles may also be 30% or more, more preferably 35% or more and less than 85%, more preferably 60% or less.

The porous carbon has a pore, which is classified into a micropore (micropores, micro-pore, micro pore), a mesopore (meso-pore, meso pore), and a macropore (macropore, macro pore) depending on the size of the pore. Herein, a pore with a diameter of 2 nm or less, a pore with a diameter of 2 to 50 nm, and a pore with a diameter of 50 nm or more are defined as a micropore, a mesopore and a macropore, respectively. The distribution of pore sizes can be determined by determining the adsorption-desorption isotherm of nitrogen and conducting an analysis based on the adsorption isotherm by a BJH method. The percentage of a mesopore volume to the total pore volume can be determined based on the distribution of the pore sizes. Similarly, the percentages of micropores and macropores can also be determined.

Generally, an inverse correlation between a mesopore percentage and a micropore percentage (a micropore percentage increases with decreasing a mesopore percentage while a micropore percentage decreases with increasing a mesopore percentage) is established. When the percentage of a mesopore volume is less than 30%, the percentage of a micropore volume is relatively increased to facilitate clogging of pores. This is considered to be because a decomposition product or a gas generated in an electrode material by decomposition of moisture by tungsten oxide becomes a clogging material. The generation of the clogging material tends to be increased with increasing the operating voltage of a capacitor, and a problem occurs, for example, particularly in the case of use at a high voltage of 2.7 V or more. Further, when the percentage of a mesopore volume is 85% or more, the percentage of a micropore volume is relatively decreased to lower an initial capacitance. An electrode material that may be sufficiently used even at 3.0 V exceeding 2.7 V is provided by adjusting the percentage of the mesopore volume to 30% or more, more preferably 35% or more and less than 85%, more preferably 60% or less. Further, a higher capacitance retention and a lower internal resistance increase rate can be achieved in comparison with the related art.

A mesopore percentage can be appropriately adjusted by activation treatment of the porous carbon. Also, the porous carbon having an appropriate mesopore percentage may be acquired from commercially available products.

As the activation method, various methods such as gas activation and chemical activation can be applied. As a gas used in the gas activation, steam, carbon dioxide, oxygen, chlorine, sulfur dioxide, sulfur vapor or the like can be used. As a chemical used in the chemical activation, zinc chloride, potassium hydroxide, sodium hydroxide, potassium carbonate, sodium carbonate, phosphoric acid, calcium chloride, potassium sulfide or the like can be used.

The kind of the porous carbon contained in the polarizable electrode material according to the present invention is not particularly limited if it is a carbonaceous substance that can form an electric double layer, and activated carbon, etc., can be used.

Activated carbon having a BET specific surface area of 500 $m^2/g$ or more, preferably 1000 $m^2/g$ or more, and 3000 $m^2/g$ or less, preferably 2500 $m^2/g$ or less, can be used. The raw material of the activated carbon is not particularly limited. As specific examples, various materials such as plant-based wood, palm shells, pulping waste liquor, fossil fuel-based coal, petroleum heavy oil, coal or petroleum-based pitch or coke obtained by thermally cracking such fossil fuels, phenolic resin, furan resin, polyvinyl chloride resin and polyvinylvinylidene chloride resin which are synthetic resins can be used.

The activated carbon can be ground by various methods such as a ball mill, a jet mill or a hammer mill. If regulation to a target particle size cannot be carried out by grinding, a particle size may also be adjusted by classification.

Also, the porous carbon may be graphite-like microcrystalline carbon produced by subjecting a carbon material to activation treatment. The microcrystalline carbon forms an electric double layer by the entry of ions or the like between crystal layers during applying a voltage and can be obtained, for example, according to a technology disclosed in Japanese Patent Laid-Open No. 11-317333.

The conductive assistant contained in the polarizable electrode material according to the present invention may include graphite having high conductivity by the presence of delocalized pi-electrons; carbon blacks (such as acetylene black, Ketjen black, other furnace blacks, channel blacks, and thermal lamp blacks) which are spherical aggregates in which a turbostratic structure is formed by aggregating several layers of graphite carbon microcrystals; and pyrolytic graphite precipitated in a thin-film state on graphite to be a substrate by gas-phase pyrolysis of hydrocarbon such as methane, propane or acetylene, etc. In particular, Ketjen black and acetylene black are preferred in light of a comparatively small particle diameter and comparatively good conductivity.

The amount of the blended conductive assistant is preferably 10 parts by mass or less, assuming that the total mass of the sum of the porous carbon particles, the conductive assistant and the binder which are the major components of the polarizable electrode material is 100 parts by mass. The total mass is a dry mass after removing a molding auxiliary used when the major components are blended. A conductive assistant is used for decreasing the contact resistance between porous carbon particles, and 10 parts by mass or more of a conductive assistant has been usually blended in a conventional polarizable electrode layer. However, when the amount of the conductive assistant is increased, the processability of the polarizable electrode layer is deteriorated, and problems such as crazing, cracks, and the deterioration of rollability occur. Also, there is a problem that, since the particle size of the conductive assistant is smaller than that of the activated carbon, gaps between the particles of the polarizable electrode layer are clogged to interfere with the diffusion of an electrolyte solution unless the conductive assistant is homogeneously dispersed.

The binder contained in the polarizable electrode material according to the present invention binds the porous carbon particles, the conductive assistant and the tungsten oxide powder. As the binder, polytetrafluoroethylene (PTFE), polyvinylidene fluoride (PVDF), polyethylene (PE), polypropylene (PP), styrene-butadiene rubber (SBR), acrylonitrile-butadiene rubber (NBR) or the like may be used.

At a working voltage of 2.7 V or more, PTFE which is hard to cause oxidation-reduction is preferred, since the oxidative decomposition or reductive decomposition of the binder also easily occurs, thereby decreasing the binding strength of particles.

The amount of the blended binder is preferably 1 to 30 parts by mass, more preferably 3 to 20 parts by mass, assuming that the total mass of the sum of the porous carbon particles, the conductive assistant and the binder which are the major components of the polarizable electrode material is 100 parts by mass. The total mass is a dry mass after removing a molding auxiliary used when the major components are blended. When the amount of the blended binder is less than 1 part by mass, it becomes difficult to maintain the porous carbon particles in the polarizable electrode material. Conversely, when the blending amount is more than 30 parts by mass, the energy density of the electric double layer capacitor becomes low and its internal resistance becomes high.

The polarizable electrode material according to the present invention can be produced in layer form to make a polarizable electrode layer by a sheet production method, application method (coating method), or the like. The sheet production method is a method of preforming the sheet (electrode layer) of the electrode material and thereafter adhering the sheet to the aluminum foil; and the application method (coating method) is a production method of applying (coating) the electrode material on aluminum foil which is a collector to form an electrode layer. When the same activated carbon is used, the sheet production method provides a higher capacitance than the coating method. Further, for homogeneously dispersing tungsten oxide, of which the specific gravity is different greatly from that of a carbon material, in an electrode, the sheet production method is more suitable than the coating method. Therefore, in the present invention, the sheet production method is preferable as a method for producing an activated carbon electrode.

In the case of the sheet production method, for example, the porous carbon particles obtained by the above-mentioned method can be regulated to have such particle sizes that their average particle diameter D50 is around 5 to 200 μm, thereafter added and kneaded with the conductive assistant, the tungsten oxide powder and the binder, and subjected to rolling treatment to be shaped in sheet form. During the kneading, a liquid auxiliary such as water, ethanol or acetonitrile may also be appropriately used singly or in a mixture.

An electric double layer capacitor has a structure in which a pair of polarizable electrode layers are made to face each other via a separator and to be a positive electrode and a negative electrode. Each polarizable electrode layer is joined to a collector; and each polarizable electrode layer is impregnated with a water-based electrolyte solution or a non-water-based electrolyte solution. The electric double layer capacitor is an electrical storage element in which the capacitance of an electric double layer formed by adsorption/desorption of electrolyte ions on an interface between a polarizable electrode layer and an electrolyte solution is utilized.

As the separator, an insulation material such as microporous paper, glass, or a porous film made of plastic such as polyethylene, polypropylene, polyimide or polytetrafluoroethylene can be used. The thickness of the separator is generally around 10 to 100 μm.

Selection of an appropriate non-water-based electrolyte solution as an electrolyte solution enables an operation at a voltage that is equal to or higher than the voltage at which water is electrolyzed. As the non-water-based electrolyte solution, a known non-water-based electrolyte solution conventionally used in an electric double layer capacitor can be adequately employed depending on the solubility of an electrolyte in a solvent, and the reactivity with an electrode, or the like. The solvent of the non-water-based electrolyte solution may include carbonates such as propylene carbonate and butylene carbonate; lactones such as β-butyrolactone and γ-butyrolactone; sulfolane; amide-based solvents such as dimethylformamide; nitromethane; 1,2-dimethoxyethane; acetonitrile; and the like. The solvent may be used singly or may be used as a mixed solvent in combination of two kinds or more.

As the electrolyte of the electrolyte solution, quaternary ammonium salts, quaternary imidazolium salts, quaternary pyridinium salts, quaternary pyrrolidinium salts, quaternary phosphonium salts and the like which have been conventionally used can be used singly or as a mixture of two kinds or more; and electrolytic counter anions can be exemplified by $BF_4^-$, $PF_6^-$, $AsF_6^-$, $ClO_4^-$, $CF_3SO_3^-$, $(CF_3SO_2)_2N^-$, $AlCl_4^-$, $SbF_6^-$ and the like. The concentration of the electrolyte in the electrolyte solution is preferably 0.5 mol/L or more, further more preferably 1.0 mol/L or more. The upper limit of the concentration of the electrolyte is solubility depending on the specific combination of the electrolyte and the solvent.

In the electric double layer capacitor according to the present invention, the polarizable electrode material according to the present invention is disposed in at least a side of the negative electrode via the separator. Even when the polarizable electrode material according to the present invention is disposed only in a negative electrode side, the electric double layer capacitor having advantages (high energy density and excellent long-term reliability) offered by the present invention can be obtained. Since tungsten oxide is expensive, use thereof only in one electrode results in the small amount of tungsten oxide used and a great cost merit.

In the electric double layer capacitor according to the present invention, a pair of the positive and negative polarizable electrode materials according to the present invention may also be disposed via the separator. In this case, the electric double layer capacitor having advantages (high energy density and excellent long-term reliability) offered by the present invention can be obtained.

EXAMPLES

Example 1

Evaluation of Surface Area of Tungsten Oxide Per 1 g of Polarizable Electrode Material Polarizable electrode materials were produced by varying the surface area of tungsten oxide per 1 g of each polarizable electrode material. The electrical characteristics of electric double layer capacitors in which the various polarizable electrode materials were used were measured and evaluated.

[Polarizable Electrode Material]

A mixture containing 80 parts by mass of palm shell activated carbon subjected to steam activation ("YP-80F" manufactured by Kuraray Chemical Co., Ltd.) having a specific surface area of about 2100 $m^2$/g by a BET method as porous carbon particles, 10 parts by mass of an acetylene black powder ("Denka Black Powdery Product" manufactured by Denki Kagaku Kogyo Kabushiki Kaisya) as a conductive assistant, 10 parts by mass of a polytetrafluoroethylene powder ("Teflon 6J" manufactured by Du Pont-Mitsui Fluorochemicals Company, Ltd.) as a binder, and each of various tungsten trioxides (see Table 1) of which the kind and addition amount were adjusted so that its surface area per 1 g of a polarizable electrode material was a specified value was added and knead with 30 parts by mass of ethanol, followed by paste-extrusion of the resultant in tape form. Thereafter, rolling of the resultant tape-like product was performed three times to make the product in sheet form, and a polarizable electrode material sheet of 100 mm in width and 150 μm in thickness was obtained by further drying the product at 150° C. for 1 hour to remove ethanol.

[Collector]

A high-purity etched aluminum foil of 150 mm in width and 50 μm in thickness ("C512" manufactured by KDK Corporation) was used as a collector.

[Production of Polarizable Electrode]

Figure 1:
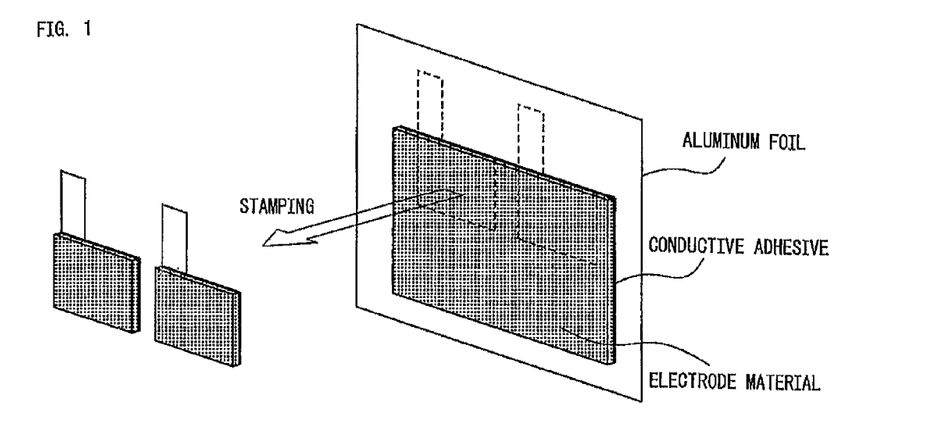
FIG. 1 is a schematic view illustrating a method for stamping electrodes produced in Example and Comparative Example.

A conductive adhesive liquid (Varniphite T-602 manufactured by Nippon Graphite Industries, Co., Ltd.) was applied to one surface of the collector, an electrode material sheet was stacked thereon, and they were passed through a compression roll and press-fitted by pressure to obtain a laminating sheet in which they were affixed to each other on their contact interfaces. The laminating sheet was put in an oven set at a temperature of 150° C. and maintained for 10 minutes, and a polarizable electrode was obtained by evaporating and removing a dispersion medium from a conductive adhesive liquid layer. As illustrated in FIG. 1, this laminating sheet was stamped so that a part on which the polarizable electrode material sheet was laminated had a dimension of 3 cm per side and a lead portion (portion in which the polarizable electrode was not laminated on the collector) had a shape of 1×5 cm to make square-shaped polarizable electrodes.

[Production of Electric Double Layer Capacitor]

Figure 2:
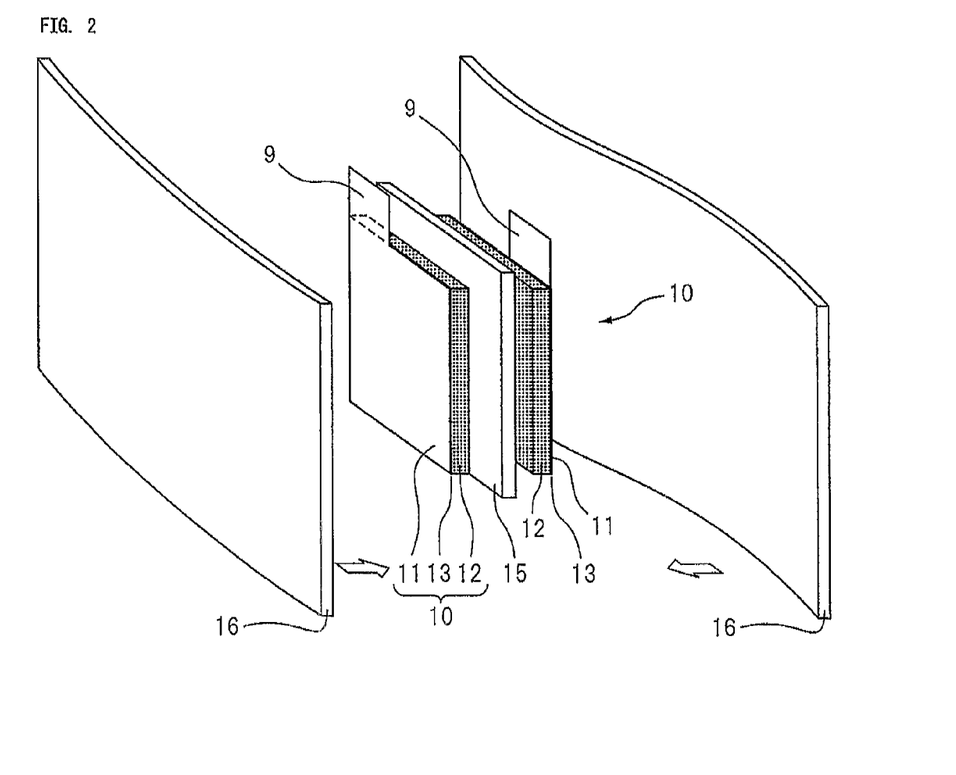
FIG. 2 is a schematic perspective view illustrating a constitution in which an electrode member according to the present invention and a separator are combined.

The two polarizable electrodes were used as positive and negative electrodes, one porous PTFE sheet ("BSP0708070-2" manufactured by W. L. Gore & Associates, Inc. Co., Ltd.) subjected to hydrophilization treatment, having a thickness of 80 μm and a dimension of 3.5 cm per side, was inserted as a separator therebetween, the electrodes and the separator portion were covered with two aluminum laminate materials of 5×10 cm ("PET12/AL20/PET12/CPP30 dry laminate product" manufactured by Showa Denko Packaging Co., Ltd.), and three sides including the lead portions were sealed by heat seal to make an aluminum pack cell. (FIG. 2 illustrates an electric double layer capacitor prior to heat-sealing the aluminum laminate materials.) In the case of the heat seal, a part of the lead portion was drawn to the outside of the aluminum pack cell so that a joining portion between the lead portion and the aluminum pack cell was sealed by the heat seal of the lead portion and the aluminum laminate materials. The aluminum pack cell was vacuum dried at 150° C. for 24 hours and thereafter brought into a glove box in which a dew point of −60° C. or less was kept under argon atmosphere, 4 mL of a solution constituted by 1.5 mol/L of triethyl methyl ammonium tetrafluoroborate/propylene carbonate (TEMA/PC) as an electrolyte solution was injected into the aluminum pack with an opening (side that was not sealed) facing upward and was left at rest for 10 minutes under reduced pressure of −0.05 MPa, and a gas in the electrodes were replaced with the electrolyte solution. Finally, the singly-laminated electric double layer capacitor was produced by fusion-sealing the opening of the aluminum pack. This electric double layer capacitor was stored at 40° C. for 24 hours to age the electrolyte solution up to the inside of the electrodes. Then, the capacitor was sandwiched between SUS plates of 5×5 cm and 5 mm in thickness and pressurized at 1 MPa from a surface direction to produce the electric double layer capacitor of Example 1.

The above-described electric double layer capacitor was evaluated as described below.

<Test for Evaluating Durability Performance>

The produced electric double layer capacitor was operated at a voltage of 3.0 V which was higher than 2.7 V. Capacitances and internal resistances were measured, when starting the operation and after the operation for 1000 hours, and were compared to evaluate a degree of the maintenance of capacitance and a degree of the increase in the internal resistance.

More specific measurement items are as follows.

[Capacitance Density]

Assuming that the operation of charging the above-described electric double layer capacitor, connected to a 4ch discharge and charge tester manufactured by Power Systems Co., Ltd., for 1500 seconds under the conditions of 10 mA/cm$^2$ and 3.0 V and discharging electricity until at 0 V under the condition of 10 mA/cm$^2$ was one cycle, when 10 cycles were continuously performed, a discharge curve from the start of the discharge at the tenth cycle to 0 V was integrated, the capacitance of the electric double layer capacitor in the charge at the tenth cycle was determined, and a capacitance density was calculated by dividing the capacitance by an electrode volume.

[Direct Current Internal Resistance]

A discharge curve ranging from discharge starting to 10% of the total discharge time was subjected to straight-line approximation by a least square method, and a direct current internal resistance was determined from the expression of $R=\Delta V/I$ using the voltage difference $\Delta V$ from a discharge starting voltage at the time of the discharge starting.

[Capacitance Retention]

Assuming that the operation of float-charging the above-described electric double layer capacitor under the conditions of 10 mA/cm$^2$ and 3.0 V under a temperature of 70° C. for 100 hours and thereafter discharging electricity until at 0 V under the condition of 10 mA/cm$^2$ was one cycle, this operation was repeated. Capacitances at the first cycle and the cycle at the time of a lapse of the predetermined time (1000 hours) were determined by the method described above in the capacitance density, and, from the results, a capacitance retention was evaluated by a retention rate of the capacitance at the time of the lapse of the predetermined time to the capacitance at the time of starting the measurement (the first cycle) [100×(capacitance at a cycle at the time of a lapse of predetermined time)/(capacitance at the first cycle)] (%).

[Internal Resistance Increase Rate]

A direct current internal resistance was also measured when the above-described capacitance retention was measured to evaluate an internal resistance increase rate by (internal resistance at the time of a lapse of predetermined time)/(initial internal resistance)×100.

The results are listed in Table 1. Further, FIG. 3 indicates the graph in which the relationships between the surface areas of tungsten oxide per 1 g of the electrode and the capacitance retentions after the testing are plotted.

TABLE 1

| Sample number | Tungsten oxide (WO$^3$) | | | WO3 surface area per 1 g of electrode material (m$^2$/g) | Porous carbon particles | | Capacitance retention (%) | Internal resistance increase rate (%) | Initial capacitance density (F/cm3) | Initial internal resistance ($\Omega$) |
| | Specific surface area (m$^2$/g) | Primary particle diameter (μm) | Addition amount (wt %) | | Activated carbon | Mesopore percentage (%) | | | | |
|---|---|---|---|---|---|---|---|---|---|---|
| 101 | 15 | 0.055 | 20 | 3 | YP80F | 42 | 89 | 160 | 13.4 | 0.6 |
| 102 | 10 | 0.084 | 10 | 1 | YP80F | 42 | 89 | 160 | 13.4 | 0.6 |
| 103 | 10 | 0.084 | 3 | 0.3 | YP80F | 42 | 85 | 160 | 13.5 | 0.6 |
| 104 | 4 | 0.209 | 15 | 0.6 | YP80F | 42 | 88 | 160 | 13.4 | 0.6 |
| 105 | 4 | 0.209 | 10 | 0.4 | YP80F | 42 | 87 | 160 | 13.4 | 0.6 |
| 106 | 4 | 0.209 | 5 | 0.2 | YP80F | 42 | 83 | 160 | 13.5 | 0.6 |
| 107 | 4 | 0.209 | 3 | 0.12 | YP80F | 42 | 80 | 160 | 13.5 | 0.6 |
| 108 | 4 | 0.209 | 1 | 0.04 | YP80F | 42 | 79 | 160 | 13.5 | 0.6 |
| 109 | 1 | 0.418 | 15 | 0.15 | YP80F | 42 | 80 | 160 | 13.4 | 0.7 |
| 110 | 15 | 0.055 | 40 | 6 | YP80F | 42 | 89 | 160 | 13.5 | 0.8 |

Figure 3:
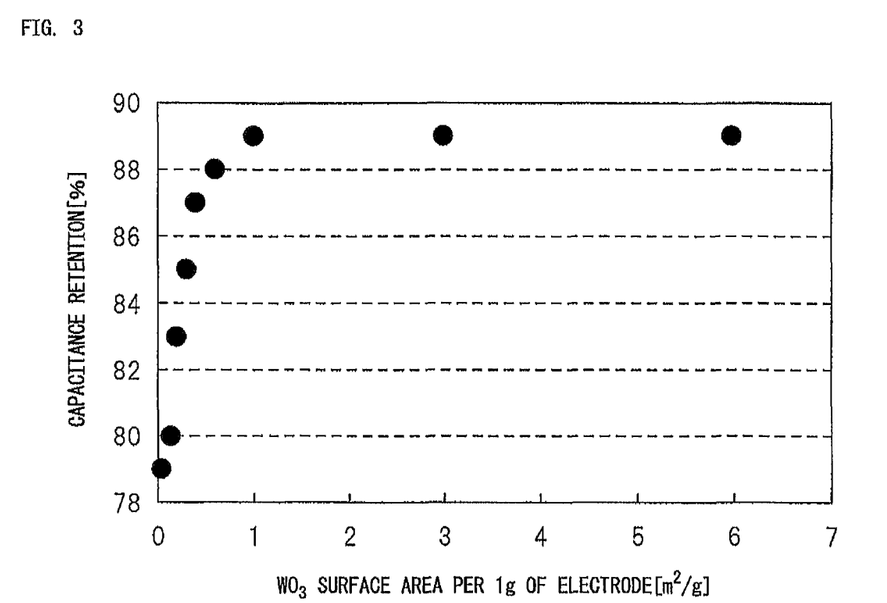
FIG. 3 is a graph in which the relationships between the surface areas of tungsten oxide per 1 g of an electrode and capacitance retentions after 1000 h testing are plotted.

Table 1 and FIG. 3 show that, when the surface area of the tungsten oxide per 1 g of the polarizable electrode material was 0.2 m² or more and less than 6 m², the capacitance density retention was 83% or more and the internal resistivity increase rate was reduced to a low level of 160%. The initial internal resistance was high when the surface area of the tungsten oxide was 6 m², and this is considered to be because the content of the porous carbon particles and the conductive assistant was relatively decreased.

Example 2

Evaluation of Percentage of Mesopore Volume in Porous Carbon Particles

Polarizable electrode materials were produced by varying the percentage of a mesopore volume to the total pore volume in porous carbon particles. The various electrical characteristics of electric double layer capacitors in which the polarizable electrode materials were used were measured and evaluated.

The polarizable electrode materials were produced by using various activated carbons with different mesopore percentages (see Table 2) as the porous carbon particles. The activated carbons that were used were MSP20 (MAXSORB manufactured by MC Evolve Technologies Corporation), YP50F (manufactured by Kuraray Chemical Co., Ltd.), and activated carbons A, B and C (produced by adjusting activation time). As tungsten oxides, tungsten trioxides of which the kinds and addition amounts were the same so that the surface areas of the tungsten oxides per 1 g of the electrode material were 1 m²/g were used. The electrode materials were produced by the same technique as in Example 1 except the above-mentioned points. The production of collectors and polarizable electrodes, the production of electric double layer capacitors, and the evaluation of the durability performance of the electric double layers were also performed by the same technique as in Example 1.

The results are listed in Table 2.

resistance increase rate was as high as 700%; and this is considered to be because a decomposition product or the like clogged the mesopores of the activated carbon. Further, when the percentage of the mesopore volume in the porous carbon particles was 85%, the initial capacitance density was as low as 7 F/cm³; and this is considered to be because the micropores in the porous carbon particles were relatively reduced.

REFERENCE SIGNS LIST

9 Collector terminal
10 Polarizable electrode
11 Collector
12 Polarizable electrode layer
13 Conductive adhesive
15 Separator
16 Aluminum laminate material

The invention claimed is:

1. A polarizable electrode material used in an electric double layer capacitor and comprising porous carbon particles, a conductive assistant, a tungsten oxide powder and a binder, wherein
    the specific surface area of the tungsten oxide is 1 m²/g to 15 m²/g, and
    the tungsten oxide is dispersed in the polarizable electrode material so that the tungsten oxide per 1 g of the polarizable electrode material has a surface area of 0.2 m² or more and less than 6 m².

2. The electrode material according to claim 1, wherein the tungsten oxide has a primary particle diameter of 0.05 μm or more and 0.4 μm or less.

3. The electrode material according to claim 1, wherein a content of the tungsten oxide in the electrode material is less than 40 mass %.

4. The electrode material according to claim 1, wherein a percentage of a mesopore volume to a total pore volume in the porous carbon particles is 30% or more and less than 85%.

TABLE 2

| | Tungsten oxide (WO³) | | | | Porous carbon particles | | | | | |
|---|---|---|---|---|---|---|---|---|---|---|
| | Specific | Primary | | WO3 surface area | | | | Internal | Initial | Initial |
| Sample number | surface area (m²/g) | particle diameter (μm) | Addition amount (wt %) | per 1 g of electrode material (m²/g) | Activated carbon | Mesopore percentage (%) | Capacitance retention (%) | resistance increase rate (%) | capacitance density (F/cm3) | internal resistance (Ω) |
| 201 | 10 | 0.084 | 10 | 1 | Activated carbon A | 49 | 90 | 150 | 13.2 | 0.6 |
| 202 | 10 | 0.084 | 10 | 1 | MSP20 | 20 | 30 | 700 | 20 | 0.9 |
| 203 | 10 | 0.084 | 10 | 1 | YP50F | 30 | 86 | 180 | 16 | 0.85 |
| 204 | 10 | 0.084 | 10 | 1 | Activated carbon B | 85 | 90 | 150 | 7 | 0.55 |
| 205 | 10 | 0.084 | 10 | 1 | Activated carbon C | 25 | 75 | 250 | 16 | 0.8 |

Table 2 shows that, when the percentage of the mesopore volume in the porous carbon particles was 30% or more and less than 85%, the capacitance density retention was 86% or more and the internal resistivity increase rate was reduced to a low level of 150 to 180%. When the percentage of the mesopore volume in the porous carbon particles was of 20%, the capacitance retention was as low as 30% and the internal 5. The electrode material according to claim 1, wherein the electrode material is made to be in sheet form by rolling treatment.

6. The electrode material according to claim 1, wherein the binder is polytetrafluoroethylene.

7. An electric double layer capacitor, wherein the electrode material according to claim 1 is disposed in at least a side of a negative electrode via a separator.

8. An electric double layer capacitor, wherein a pair of the positive and negative electrode materials according to claim 1 is disposed via a separator.

\* \* \* \* \*